(12) United States Patent
Miyajima et al.

(10) Patent No.: US 6,318,410 B1
(45) Date of Patent: Nov. 20, 2001

(54) CONNECTING STRUCTURE

(75) Inventors: Atsuo Miyajima; Minoru Kawasaki; Hiroyuki Ichikawa, all of Komaki (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/534,364

(22) Filed: Mar. 24, 2000

Related U.S. Application Data

(63) Continuation-in-part of application No. 09/249,900, filed on Feb. 17, 1999, now abandoned, which is a continuation-in-part of application No. 08/917,944, filed on Aug. 27, 1997, now abandoned, which is a division of application No. 08/746,252, filed on Nov. 7, 1996, now abandoned, which is a continuation-in-part of application No. 08/520,825, filed on Dec. 12, 1995, now abandoned, which is a continuation-in-part of application No. 08/068,710, filed on May 28, 1993, now abandoned.

(30) Foreign Application Priority Data

| | | | |
|---|---|---|---|
| May 30, 1992 | (JP) | ................................. | 4-164101 |
| May 30, 1992 | (JP) | ................................. | 4-164102 |
| May 30, 1992 | (JP) | ................................. | 4-164103 |
| May 29, 1992 | (JP) | ................................. | 4-164218 |
| Mar. 25, 1999 | (JP) | ................................. | 11-081592 |
| Mar. 16, 2000 | (JP) | ................................. | 12-074697 |

(51) Int. Cl.⁷ .................................................. F16L 11/04
(52) U.S. Cl. ................. 138/109; 138/120; 138/155; 138/177; 138/DIG. 11; 285/319; 285/331
(58) Field of Search .................... 138/109, 177, 138/DIG. 11, 120, 155, 178; 285/319, 331, 256

(56) References Cited

U.S. PATENT DOCUMENTS

| | | | | |
|---|---|---|---|---|
| 2,440,452 | * | 4/1948 | Smith | .................................. 285/321 |
| 2,788,992 | * | 4/1957 | Vienne et al. | . |
| 2,886,355 | * | 5/1959 | Wurzel | .................................. 285/321 |
| 2,898,130 | * | 8/1959 | Hansen | .................................. 285/321 |
| 3,112,939 | * | 12/1963 | Graham | .................................. 285/374 |
| 3,394,954 | * | 7/1968 | Sarns | . |
| 3,428,340 | * | 2/1969 | Pelton | .................................. 285/308 |

(List continued on next page.)

FOREIGN PATENT DOCUMENTS

| | | | | |
|---|---|---|---|---|
| 683367 | * | 3/1964 | (CA) | .................................. 285/321 |
| 1220215 | * | 6/1966 | (DE) | . |
| 2642353 | * | 3/1978 | (DE) | . |
| 2817099 | * | 11/1979 | (DE) | . |
| 2824395 | * | 12/1979 | (DE) | . |
| 3615904 | * | 2/1987 | (DE) | . |
| 3815168 | * | 9/1989 | (DE) | . |
| 4037306 | * | 11/1991 | (DE) | . |
| 2197 | * | 6/1979 | (EP) | . |
| 223495 | * | 5/1987 | (EP) | . |
| 0 385 465 | | 9/1990 | (EP) | . |
| 435360 | * | 7/1991 | (EP) | . |

(List continued on next page.)

*Primary Examiner*—James Hook
(74) *Attorney, Agent, or Firm*—Jacobson Holma, PLLC

(57) ABSTRACT

At one end of the hose body 55 formed by the thin cylindrical wall, and straight end portion 54 extending straightly and an annular groove 56 integrally mold-formed on an outer peripheral surface of the straight end portion 54 are provided. An connecting member 60 for connecting the one end of the hose body 55 with the mating member has a cylindrical portion 61 secured on an outer peripheral surface of the straight end portion 54 coaxially. When the straight end portion 54 onto which the cylindrical portion 61 is secured is inserted into the straight end portion 54, a first engaging element 60b extending radially outwardly from the cylindrical portion 61 engages with a second engaging element 77 protruded from the opened end portion 76 radially outwardly.

15 Claims, 8 Drawing Sheets

U.S. PATENT DOCUMENTS

| | | | |
|---|---|---|---|
| 3,539,205 | * | 11/1970 | Johnson, Jr. .......................... 285/374 |
| 3,574,362 | * | 4/1971 | Divernon ............................. 285/321 |
| 3,588,149 | * | 6/1971 | Demier, Sr. et al. ................ 285/331 |
| 3,746,376 | * | 7/1973 | Gold . |
| 3,751,541 | * | 8/1973 | Hegler ................................. 264/508 |
| 3,838,713 | | 10/1974 | Tubbs . |
| 3,873,137 | * | 3/1975 | Yamaguchi .......................... 285/235 |
| 3,891,733 | * | 6/1975 | Maroschak .......................... 264/508 |
| 4,006,922 | * | 2/1977 | Bartholomew ........................ 285/39 |
| 4,099,744 | * | 7/1978 | Kutnyak et al. .......................... 285/7 |
| 4,123,091 | * | 10/1978 | Cosentino et al. . |
| 4,270,776 | * | 6/1981 | Tolliver ................................. 285/226 |
| 4,486,034 | * | 12/1984 | Sauer ................................... 285/319 |
| 4,487,437 | * | 12/1984 | Dickirson ............................. 285/319 |
| 4,603,890 | * | 8/1986 | Huppee ................................. 285/239 |
| 4,632,435 | * | 12/1986 | Polyak ................................. 285/319 |
| 4,679,827 | * | 7/1987 | Law ...................................... 285/423 |
| 4,682,798 | * | 7/1987 | Saur . |
| 4,752,208 | * | 6/1988 | Iwata et al. ........................... 425/577 |
| 4,753,459 | * | 6/1988 | Potier ................................... 285/174 |
| 4,786,085 | * | 11/1988 | Sauer et al. ........................... 285/319 |
| 4,850,622 | * | 7/1989 | Suzuki ................................. 285/351 |
| 4,907,957 | * | 3/1990 | Nakagawa et al. ................... 425/132 |
| 4,972,875 | * | 11/1990 | Beer et al. ............................. 285/903 |
| 5,029,904 | * | 7/1991 | Hunt ..................................... 285/319 |
| 5,039,139 | * | 8/1991 | McElroy et al. . |
| 5,060,983 | * | 10/1991 | Lee ....................................... 285/903 |
| 5,078,429 | * | 1/1992 | Braut et al. ........................... 285/319 |
| 5,228,729 | * | 7/1993 | McElroy et al. . |
| 5,267,757 | * | 12/1993 | Dal Palu . |
| 5,413,386 | * | 5/1995 | Dal Palú ............................... 285/319 |
| 5,609,370 | * | 3/1997 | Szabo et al. .......................... 285/319 |
| 5,636,875 | * | 6/1997 | Wasser ................................. 285/331 |
| 5,882,048 | * | 3/1999 | Kawasaki et al. .................... 285/319 |
| 6,082,783 | * | 7/2000 | Kawasaki et al. .................... 285/321 |
| 6,199,919 | * | 3/2001 | Kawasaki et al. .................... 285/319 |

FOREIGN PATENT DOCUMENTS

| | | | |
|---|---|---|---|
| 459812 | * | 12/1991 | (EP) . |
| 469949 | * | 2/1992 | (EP) . |
| 287446 | * | 10/1988 | (EP) ...................................... 285/321 |
| 2533996 | * | 10/1982 | (FR) . |
| 1036459 | | 7/1966 | (GB) . |
| 2153028 | * | 8/1985 | (GB) . |
| 2217419 | * | 10/1989 | (GB) . |
| 2244774 | * | 12/1991 | (GB) . |
| 1-15981 | * | 5/1989 | (JP) . |
| 4-13486 | * | 3/1992 | (JP) . |
| 4-282 232 | * | 10/1992 | (JP) . |
| 5-60281 | * | 3/1993 | (JP) ...................................... 285/321 |

\* cited by examiner

CONNECTING STRUCTURE

This application is a continuation-in-part of application Ser. No. 09/249,900, filed Feb. 17, 1999, now abandoned, which is a continuation-in-part of application Ser. No. 08/917,944, filed Aug. 27, 1997, now abandoned, which is a divisional of application Ser. No. 08/746,252, filed Nov. 7, 1996, now abandoned, which is a continuation of application Ser. No. 08/570,825, filed Dec. 12, 1995, now abandoned, and which is a continuation of application Ser. No. 08/068,710, filed May 28, 1993, now abandoned.

BACKGROUND OF THE INVENTION

1. Field of the Invention

This invention relates to a connecting structure for connecting a filler hose or an air hose with a mating member in an automobile.

2. Description of the Related Art

Recently, as the filler hose and so on for an automobile, a resin hose, a metallic hose and a hose combined with both hoses which are excellent in a gasoline permeability-proof character, have been widely used, instead for a rubber hose. For example, a hose connecting structure in which one end of the resin hose is detachably connected to the mating member has been known in Japanese Unexamined Patent Publication No. 5-329956.

That is, the prior hose connecting structure disclosed in the above Japanese Unexamined Patent Publication No. 5-329956 is, as shown in FIGS. 1 and 2, comprised of a hose 10 and a mating member 45 with which the hose body 10 can be connected. The hose body 10 is blow-formed (blow-molded) by a resin material, and is constructed by a hose body 15 including straight end portions 28 extending straightly at both ends thereof and an engaging member 34 attached to an outer surface of at least one straight end portion of the hose body. Here, an intermediate portion 20 having a bellow portion 22 is extended between the straight end portions 28.

On an outer surface of the tubular straight end portion 28, seal grooves 24 into which annular sealing members 23 are fitted are formed at a tip or front end, an annular large-diameter portion 25 having a large diameter is formed at a rear end, and an annular groove 26 for fitting is formed at an intermediate portion, respectively. The annular large-diameter portion 25 located at the rear end of the straight end portion 28 is formed to make an inner diameter of the intermediate portion 20 larger than an inner diameter of the straight end portion 28, thereby maintain a large flowing amount of the filler.

The engaging member or connecting member 34 includes an annular base portion 34a, a plurality of arm portions 34b, and first engaging portions 34c. Each of the arm portion 34b extends parallel to the straight end portion 28 toward the front end thereof via a support portion standing up from the annular base portion 34a radially outwardly. Each of the first engaging portion 34c is formed at a free end of the arm portion 34b to directed radially inwardly. The engaging member 34 is attached to the straight end portion 28 by forcedly fitting the annular base portion 34a into the ring groove 26, and is protruded radially outwardly.

On the other hand, a metallic or a resin pipe 45 as the mating member includes tubular opened end portion 44 and an annular second engaging portion 42. The opened end portion 44 has an inner diameter slightly larger than an outer diameter of the straight end portion Z8 of the resin hose 10, and the annular second engaging portion 42 is formed by folding back an opened tip end of the opened end portion 44 axially outwardly to be protruded from an outer surface of the opened end portion 44 radially outwardly.

When the resin hose 10 is connected with the pipe 45, the straight end portion 28 is inserted into the opened end portion 44. As insertion of the straight end portion 28, the arm portions 34b of the engaging member 34 are elastically or resiliently deformed radially outwardly once by the second engaging portion 42, and then returned radially inwardly when it has passed by the second engaging portion 42, whereby the first engaging portion 34c engages with the second engaging portion 42.

By the way, in the above connecting structure the intermediate portion 20 of the hose body 15 is preferably formed by a thin tubular wall to increase flexibility of the hose body 15.

However, the hose body 15 is usually produced by a blow-forming when it is made of the resin material, and is produced by a metal liquid bulge forming at the end portion and/or the bellow partially by a thin tube drawn into a constant thickness when it is made of the metallic material. For this reason, making only the intermediate portion 20 thinner than the both straight end portions 28 is difficult in both of the resin hose and metallic hose, that is, to increase the flexibility of intermediate portion 20, the whole hose body 15 needs to be thinned. Thus, the straight end portions 28 are also thinned to reduce strength or rigidity thereof.

As a result, when the straight end portion 28 of the hose body 15 is connected to the opened end portion 44 of the mating member 45 and the fluid is flown therethrough, an axially central portion of the straight end portion 28 bulges radially outwardly by the fluid pressure. In this way, the sealing character by the sealing member 23 between the straight end portion 28 and the opened end portion 44 may be deteriorated, and the engagement of the first engaging portion 34c with the second engaging portion 42 may be disengaged.

Also, when this connecting structure is used under a cold environment below 10° C., the axially central portion of the straight end portion 28 may be shrunk radially inwardly, so that the disadvantages that the sealing character by the sealing member 23 between the straight end portion 28 and the opened end portion 44 may be deteriorated and the engagement of the first engaging portion 34c with the second engaging portion 42 may be disengaged are caused.

SUMMARY OF THE INVENTION

The present invention has been made in view of the above circumstances and has a first object to provide a connecting structure of a hose with a mating member which can increase a sealing character between a straight end portion of the hose body and an opened end portion of the mating member securely by reinforcing the straight end portion of the hose body by the connecting member, when the whole hose body is formed by a thin tubular wall in view of the flexibility of the intermediate portion of the hose body. Also, the present invention has a second object to provide the connecting structure of the hose with the mating member in which a first engaging portion of the connecting member attached to the hose body can engage with a second engaging portion of the mating member strongly by reinforcing the straight end portion of the hose body by the connecting member, when the whole hose body is formed by a thin tubular wall in view of the flexibility of the intermediate portion of the hose body.

Inventors of this application have hit on to strength the straight end portion by a part of the connecting member attached to an outer surface of the straight end portion, by improving shape of the connecting member.

In order to achieve the above object, the hose connecting structure for connecting a tubular hose body formed by a thin cylindrical wall with a mating member in a fluidtight condition, comprises said tubular hose body including the thin cylindrical wall having an outer surface an an inner surface extending substantially parallel to the outer surface in the tube, and extending from one end to other end; a straight end portion formed integral with said hose body at least at the one end extending straightly, and an annular groove formed on a mold-formed outer surface thereof and extending radially inwardly integral with the mold-formed outer surface at position axially spaced from a tip end, to be connected with said mating member; an connecting member including a cylindrical portion secured to the outer surface of said straight end portion coaxially therewith, an annular protrusion extending radially inwardly from an inner peripheral surface of other end of the cylindrical portion and fitted into the annular groove, a sealing groove formed on an outer peripheral surface of the one end of the cylindrical portion, a plural first engaging elements each extending radially outwardly from the outer peripheral surface of the other end of the cylindrical portion to provide a radial space between the first engaging element and the outer peripheral surface of the cylindrical portion by slot, each of said first engaging elements having a deforming portion and engaging pawl formed at a free end of the deforming portion directed radially inwardly integral and arranged on the cylindrical portion spaced from each other circumferentially; a mating member including a tubular opened end portion having an engaging inner peripheral surface adapted to receive the cylindrical portion secured on the outer surface of said straight end portion of said hose body; a second engaging element formed at an entry portion of the opened end portion of said mating member protruded radially outwardly, said second engaging element engaging with said first element when said straight end portion of said hose body is inserted into the engaging inner peripheral surface of the opened end portion together with the cylindrical portion secured to said straight end portion; and a sealing member mounted into the sealing groove for sealing between the engaging inner peripheral surface of the opened end portion of said mating member and an engaging outer peripheral surface of the cylindrical portion inserted into the engaging inner peripheral surface of the opened end portion together with said straight end portion.

According to the connecting structure of the present invention, the cylindrical portion of the connecting member is secured onto the outer surface of the straight end portion of the hose body coaxially therewith to reinforce the straight end portion. For this reason, even when the whole hose body is formed by the thin tubular wall in view of flexibility of the intermediate portion of the hose body, the bulge deformation of the straight end portion by the fluid pressure and the shrink deformation of the hose body under the low-temperature environment are prevented, whereby the hose body would not deform when the hose body is connecting with the mating member. As a result, the gap between the straight end portion of the hose body and the opened end portion of the mating member can be securely sealed. Also, the disengagement of the first engaging element attached to the hose body from the second. engaging element of the mating member would be prevented.

The hose connecting structure of the present invention can have following modes or modifications.

A connecting structure is comprised of a hose and a mating member, and the includes a hose body and an connecting member attached thereto integrally.

A tubular hose body extending from one end to other end can be formed by a thin cylindrical wall, and is provided with at least one end thereof a straight end portion where the cylindrical wall extending substantially straightly is formed by a mold-forming (molding) integral with the hose body to be connected with the mating member. In the straight end portion, at least an outer surface which is mold-formed (molded), and an annular groove extending radially inwardly from the smooth outer surface at position axially spaced from a tip end of the straight end portion are mold-formed integral with the molded surface. The annular groove is preferably formed on a surface of a large-diameter portion located at rear portion of the straight end portion and has diameter larger than that of the tip end.

The hose body is composed of a tube selected from the group consisting of a polymeric tube, a thin walled metal tube and a multi-layer-tube laminated with the polymeric tube and/or the metal tube. The method for producing a resin hose body composed of the polymeric tube comprises steps of extruding a tubular polymeric material such as a parison or the like from one extrusion head of an extruder, introducing the tubular polymeric material having a first outer diameter into a pair of cylindrical segment dies of a mold device, and expanding the tubular material from the first diameter to a second, larger diameter at which a molten tubular material engages a hollow cylindrical inner mold surface of the segmented dies by an external vacuuming and/or an internal blowing.

The whole resin hose body thus obtained is formed into the thin cylindrical wall, and the outer surface of which can be accurately formed in dimension by the mold-forming. An inner surface of the hose body is parallel to the outer surface thereof and extending in the tube along the outer surface, go that at least a straight end portion of the hose body has a substantially constant thickness. At least at one end of the hose body, the straight end portion is formed integrally in mold-forming the hose body. Here, for increasing flexibility of the hose body, a bellow portion can be formed in an intermediate portion located between the one end and the other end in mold-forming the hose body following to shape of a cavity of a pair of segment dies.

On the other hand, the metallic hose body can be produced by radially expanding a predetermined part(s) of a thin walled metal tube having a constant thickness by bulging of a liquid bulge forming machine. That is, by setting at least one end of the metal tube extending from the one end to the other end in a pair of cylindrical segment dies of the liquid bulge forming machine and applying a liquid pressure in the metal tube, the straight end portion having the mold-formed outer surface can be obtained. As occasion demands, a bellow portion radially expanded by the liquid bulge forming can be formed in an intermediate portion of the thin walled metal tube. Here, the above annular groove directed radially inwardly from the outer surface to the straight end portion can be formed simultaneous with the mold-forming of the straight end portion.

The hose body can be comprised of one layer or multi layers. In both cases, the hose body can preferably have an inner diameter of 10 mm to 35 mm, and thickness of 0.8 mm to 2.0 mm.

When the hose body is comprised of the one layer, a polyamide resin such as PA6, PA1 or PA12, or a metallic material such as aluminum or stainless steel can be used. The hose body of resin material is convenient to reduce cost, to lighten the hose body and to prevent occurrence of rust, and the hose body of metallic material is convenient to obtain the gasoline permeability-proof and conductivity.

When the hose body is comprised of two layers, it can be comprised of an inner layer made of a resin material excellent in d gasoline-proof character and gasoline permeability-proof, and an outer layer made of resin material excellent in a heat-proof character, a weather-proof character and medicine-proof character.

In this case, ETFE, PVDF or THV can be used for the inner layer, while nylon 6, nylon 11, nylon 12, urethane, polypropylene or polyethylene can be used for the outer layer. Also, the hose body can be constructed by an inner layer made of a metallic material such as the stainless steel, and an outer layer made of resin material excellent in a heat-proof character, a weather-proof character and medicine-proof character. These are convenient to increase the gasoline permeability-proof, and to lighten the hose body.

In both cases, the inner layer can have thickness of 0.1 mm to 0.5 mm, which is smaller than thickness of 0.8 mm to 1.5 mm of the outer layer. Generally, the material excellent in the gasoline-proof character and gasoline permeability-proof character and forms the inner layer is more expensive than the material excellent in the heat-proof character, weather-proof character and medicine-proof character and forms the outer layer. Thus, the thinning of the inner layer can reduce the using amount of the material to thereby reduce the cost.

The resin inner layer and outer layer can be formed simultaneously by the blow-forming of the thermoplastic resin material. The metallic inner layer can be formed by the metal liquid bulge forming of the thin metallic tube.

When the hose body is comprised of three layers, it can be constructed by an inner layer made of a material into which a metal or carbon is mixed and which is excellent in the gasoline-proof character and gasoline permeability-proof character and has conductivity, an outer layer made of a material excellent in the heat-proof character, weather-proof character and the medicine-proof character, and an intermediate character which connects the inner layer and outer layer. Conductivity of the inner layer is convenient to remove a static electricity generated in the hose body in supplying the gasoline. For the intermediate layer, polyvinylidene fluoride, polyvinyl fluoride, or fluoride plastic made of mixture thereof can be used. Various kinds of materials can be selected in the three-layered hose body.

The resin inner layer and outer layer can be formed by the blow-forming of the thermoplastic resin material, and the metallic inner layer can be formed by the metal liquid bulge forming of the thin metallic tube.

The connecting member is preferably formed integrally by the inject-forming (inject-molding) of the thermoplastic resin material, and includes the cylindrical portion secured onto the outer peripheral surface of the above straight end portion, the annular protrusion protruding from the inner peripheral surface of the cylindrical portion radially inwardly to engaged with the above: annular groove, and the first engaging element extending from the outer peripheral surface of the cylindrical portion radially outwardly. Preferably, the cylindrical portion has the thickness thicker than that of the straight end portion.

The first engaging element includes a deforming portion and an engaging pawl. The deforming portion preferably has at least a supporting portion extending radially outwardly from a rear end portion of the cylindrical portion, and plural arm portions extending substantially parallel to the cylindrical portion and spaced in the circumferential direction to each other. The second engaging element provided at the opened end portion of the mating member is inserted into the space formed between the deforming element and the cylindrical portion when the hose body is connected with the opened end portion. The arm portion preferably extends to a point shorter than an axially intermediate portion of the cylindrical portion.

Preferably, plural (for example, two or four) arm portions can be connected by a circumferential connecting portions formed integral with the arm portion at free ends thereof, which can restrain deformation of the arm portions supported at one axial end. Also, the plural (for example, two) arm portions can be connected by circumferential connecting portions formed integral with the arm portion at the free ends thereof to form a circular or ellipse-shape ring portion. The ring portion can have an inner peripheral surface of which inner diameter is larger than an outer diameter of the opened end portion of the mating member, and a pair of engaging pawls opposing radially can be preferably formed on the inner peripheral surface of the ring portion at a position located on extended lines of the arm portions.

By depressing opposed parts of the connecting portion where the engaging pawls are not formed, that is, by depressing the parts shifted by 90 degrees from the engaging pawls radially inwardly, the first engaging element elastically deforms so that the engaging pawls shift radially outwardly to be disengaged from the second engaging element. In this way, the hose once connected with the mating member can be easily disengaged therefrom.

The seal groove can be one or plural annular groove(s) formed on the outer peripheral surface of the cylindrical portion at one end (tip end) thereof.

The connecting member can be formed by inject-forming the thermoplastic resin such as PA, PP, POM, or PA, PP, POM reinforced by the glass fibers.

In attaching the connecting member to the hose body, the connecting member which is inject-formed in advance is set in the molds for the blow-forming of the hose body, and is positioned and attached to the hose body integrally in blow-forming of the hose body. On the other hand, the connecting member can be attached to the hose body in the inject-forming of the hose body by inserting a core metal through an opening of the straight end portion of the hose body which is blow-formed in advance and setting the core metal in the molds for the inject-forming of the connecting member. A fall-out preventing portion is preferably provided between the straight end portion and the cylindrical portion. For such fall-out preventing portion, an annular convex portion formed on the outer peripheral surface of the straight end portion and an annular concave portion formed on the cylindrical portion, or an adhesive agent disposed between the outer peripheral surface of the straight portion and the inner peripheral surface of the cylindrical portion, can be adopted.

The mating member has a tubular opened end portion and the second engaging element formed on the opened end portion. The opened end portion has an engaging inner surface adapted to receive the cylindrical portion secured onto the outer surface of the straight end portion. The second engaging element is formed at an entry of the opened end portion protruding radially outwardly from the outer peripheral surface to be engaged with the first engaging element when the straight end portion is inserted into the opened end portion.

The mating member can be made of the resin material such as HDPE, POM, PA6, PA11, PA12, or the metallic material such as iron stainless steel, aluminum.

The sealing member is mounted into the sealing groove formed near to the tip end of the cylindrical portion of the hose body and seals the gap between the outer engaging surface of the cylindrical portion and the inner engaging surface of the opened end portion. One or plural sealing member(s) corresponding to the numbers of the sealing grooves is mounted into the sealing groove(s).

DETAILED DESCRIPTION OF THE PREFERRED EMBODIMENT

Hereinafter, various embodiments of the present invention will be explained with reference to attached FIGS. 3 to 14.

Figure 3:
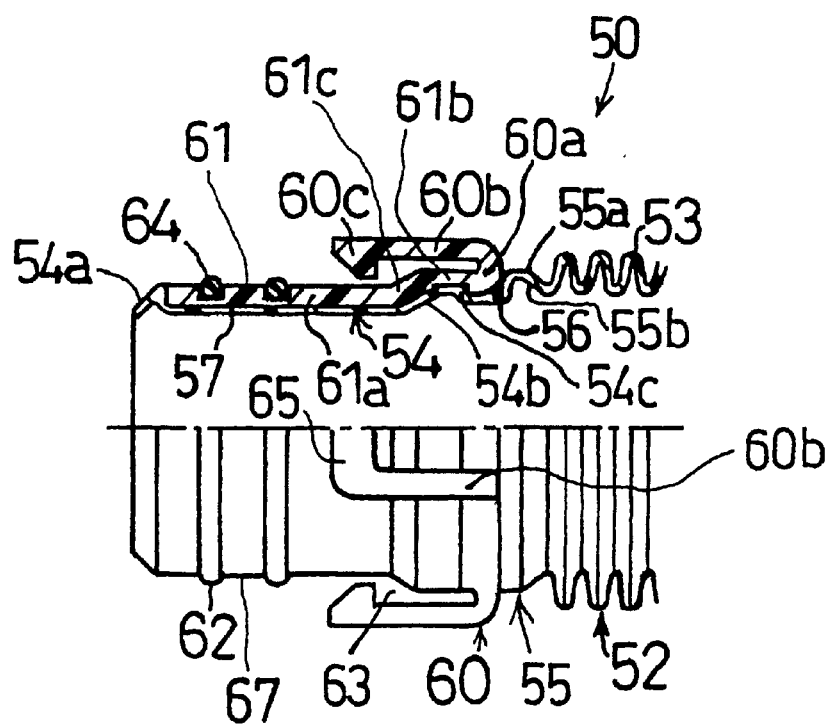
FIG. 3 is a half cross-sectional view showing a main part of the embodiment of the hose according to the present invention.

As shown in FIG. 3 which is a half cross-sectional view for showing a main part for explaining one embodiment of the hose used in the present invention, a hose 50 is constructed by a tubular hose body 55 formed by a mold-forming, and a connecting member 60 attached to at least one end integrally. Therefore, the hose body 55 is formed by a thin circle tubular wall defined by a molded outer surface 55a and an inner surface 55b extending parallel to the outer surface 55a in the tube and having constant thickness, and extending from one end to the other end. As shown in FIG. 3, a straight end portion 54 extending substantially straightly is formed at one end of the hose body 55 integrally therewith in blow-forming the hose body 55, of course, a straight end portion same as the above straight end portion 54 can be formed on other straight end portion (not shown).

On the outer surface 55a of the straight end portion 54 molded smoothly, an annular groove 56 having rectangular cross-section and extending radially inwardly is formed, at position spaced axially from a tip end of the straight end portion 54 integral with the outer surface so that the connecting member 60 is attached to the straight end portion 54 firmly. The straight end portion 54 is provided at a tip end thereof an annular swelled portion 54a swelled radially outwardly and having a guiding surface, and at a rear portion thereof axially spaced from the annular swelled portion 54a a large-diameter portion 54c including a tapered portion 54b having gradually increasing diameter, whereby an annular concave or recess 57 is formed between the annular swelled portion 54a and the large-diameter portion 54c.

The connecting member 60 is constructed by a linear cylindrical portion 61, an annular protrusion 60a, a supporting portion 60f, plural arm portions 60b, and engaging pawls 60c. The linear cylindrical portion 61 covers an outer surface of the hose body 55 and the straight end portion 54 and has a constant thickness. The annular protrusion 60a protrudes radially inwardly from an inner peripheral surface of other axial end of the linear cylindrical portion 61 to and is fitted into the annular groove 56, while the supporting portion 60f stands radially outwardly from an outer peripheral surface of the other axial end of the linear cylindrical portion 61 and has a flange-like or pillar-like shape. Plural arm portions 60b extend from the supporting portion 60f toward the one axial end of the linear cylindrical portion 61 parallel to the linear cylindrical portion 61, and the engaging pawl 60c directed radially inwardly is formed at a free end of each of the arm portions 60b. The connecting member 60 is inject-formed integrally by a resin material such as a reinforced PA12. Here, the arm portions 60b are defined by both circumferential end portion 60b1 and a connecting portions 65 connecting the adjacent circumferential end portion 60b1, and a enclosed central part is removed.

In detail, the linear cylindrical portion 61 has thickness thicker than that of the straight end portion 54, and is provided with a small-diameter portion 61a fitted into the annular recess 57 located between the annular swelled portion 54a and the large-diameter portion 54c, a large-diameter end portion 61b covering the large-diameter portion 54c, and a tapered portion 61c extending between the small-diameter portion 61a and the large-diameter end portion 61b. An outer peripheral surface of the small-diameter portion 61a forms an engaging outer surface 67. Each of the radial spaces 63 is formed between the outer peripheral surface of the small-diameter portion 61a and each of the arm portions 60b by slot.

In this way, the connecting member 60 is attached to the straight end portion 54 firmly so as not to be shifted axially. Here, as occasion demands, an adhesive agent can be disposed between the straight end portion 54 and the linear cylindrical portion 61. Two sealing grooves 64 spaced axially each other are formed on the outer peripheral surface of the linear cylindrical portion 61, and sealing members 62 such as O ring are mounted into the sealing grooves 64.

Figure 4:
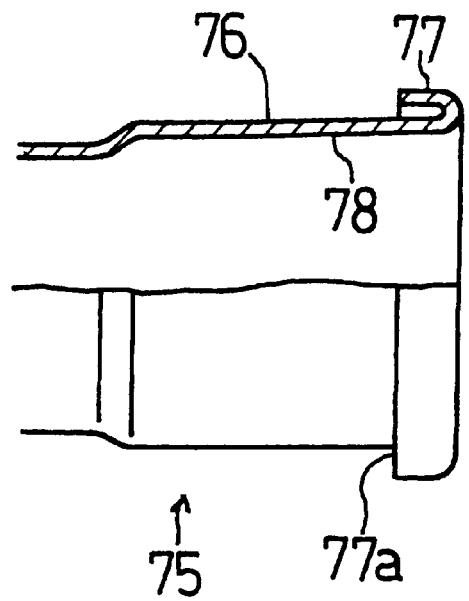
FIG. 4 is a half cross-sectional view showing the main part of the mating member with which the hose shown in FIG. 3 is connected.

A tubular mating member 75 with which the above hose body 55 is connected under a fluidtight condition is shown in FIG. 4. The mating member 75 includes an opened end portion 76 and an annular engaging protrusion 77. The opened end portion 76 has an engaging inner peripheral surface 78 adapted to receive the linear cylindrical portion 61 fitted onto the outer surface of the straight end portion 54. The annular engaging protrusion 77 is formed at an entry portion of the opened end portion 76 to be protruded radially outwardly, and inserted into the gap 63 by a snap action when the linear cylindrical portion 61 is inserted into the opened end portion 76 to engage with the engaging pawls 60c.

Here, the above arm portions 60b having the engaging pawls 60c constitute the first engaging element, while the annular engaging protrusion 77 constitute the second engaging element, of the present invention.

In the above embodiment, the hose body 55 is produced by extruding and blow-forming the tubular polymeric material such as parison or the like. However, a straight end portion same as the above straight end portion 54 and a bellow portion in the intermediate portion as occasion demands, can be formed by a bulging of a liquid bulge-forming machine one end of the thin walled metal tube made of the aluminum alloy etc. and having a constant thickness.

When the resin hose 50 is connected with the pipe 75, the straight end portion 54 is inserted into the opened end portion 76. As insertion of the straight end portion 54, the arm portions 60b of the connecting member 60 are elastically or resiliently deformed radially outwardly once by the second engaging portion 77, and then returned radially inwardly when it has passed by the second engaging portion 77, whereby the first engaging portion 60c engages with the end surface 77a of the second engaging portion 77. Thus, the resin hose 50 and the pipe 75 are connected firmly and securely.

Figure 5:
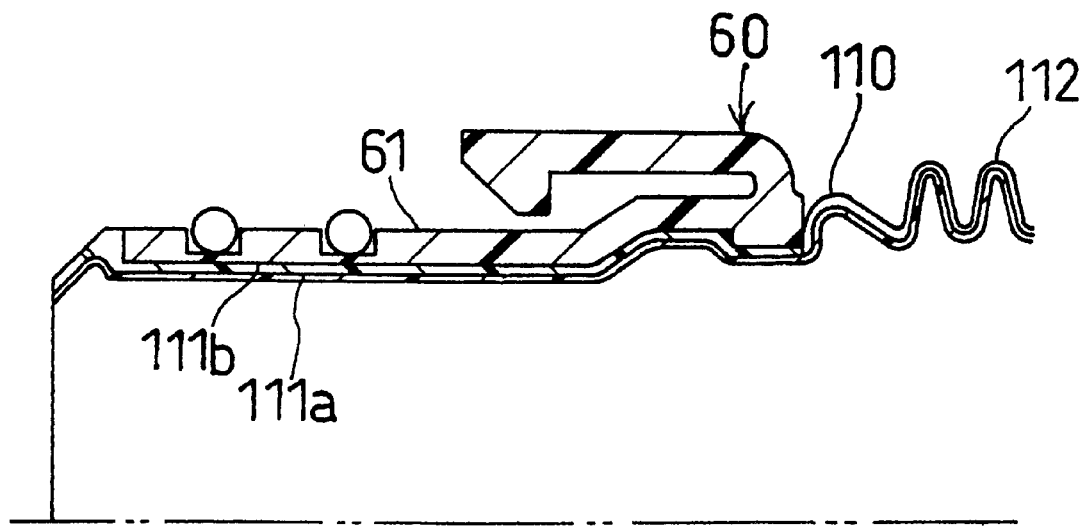
FIG. 5 is a cross-sectional view in which lower half is omitted for explaining other embodiment of the hose body.

It is noted that the present invention is not limited to the above embodiment. For example, although the above hose body 55 is constructed by one layer, as shown in FIG. 5, the hose body 110 can have a two-layers construction. That is, the hose can be comprised of the above connecting member 60 shown in FIG. 3 and a hose body 110 having the two-layers construction. In detail, the hose body 110 includes an inner layer 111a made of the resin material such as ETFT etc. excellent in the gasoline permeability-proof character, and an outer layer 111b made of the resin material such as polyamide. excellent in the heat-proof character, the medicine-proof character and the pressure-proof character. The hose body 110 can be produced by co-extrusion of two different kinds of the resin materials simultaneously. Of course, a bellow portion 112 can be formed in the intermediate portion like the above hose body.

Figure 6:
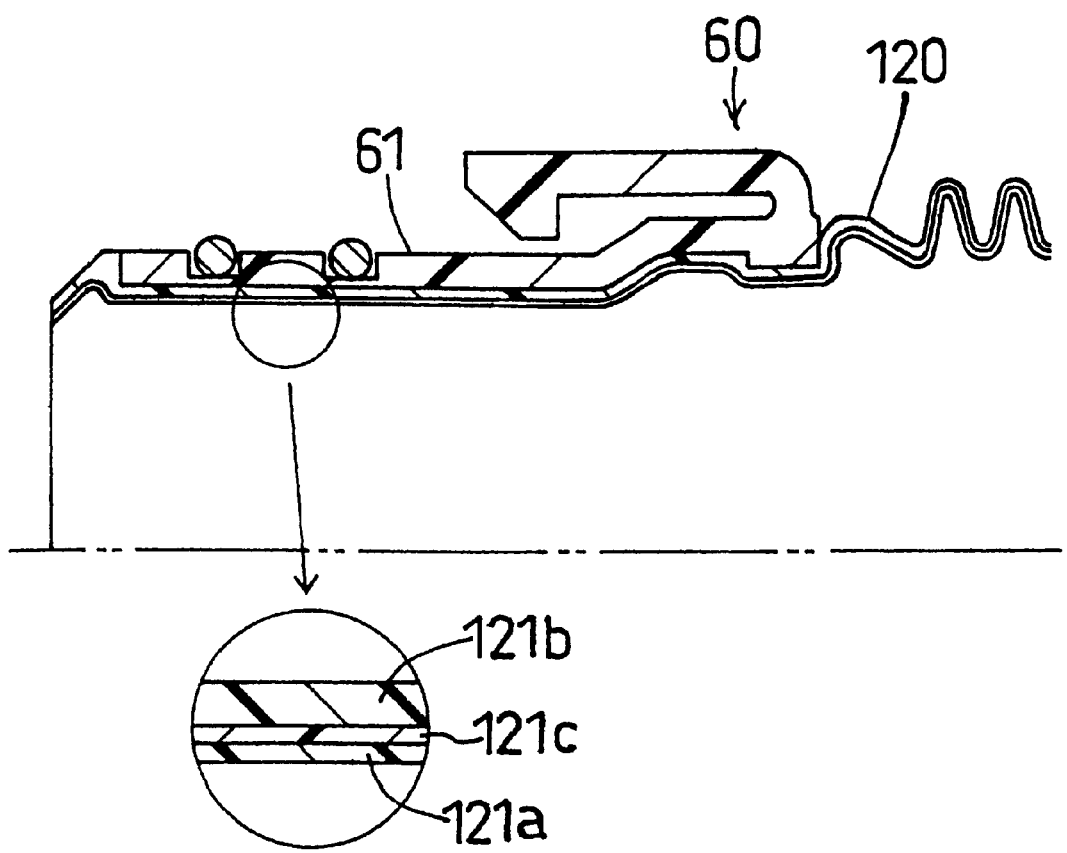
FIG. 6 is a cross-sectional view in which lower half is omitted for explaining still other embodiment of the hose body.

Also, as shown in FIG. 6, a hose can be comprised of the above engaging member 60 and a hose body 120 having a three-layers construction. That is, the hose body 120 includes an inner layer 121a made of the resin material such as EPFT having the gasoline permeability-proof character with which a carbon is mixed to give the conductivity, and an outer layer 121b made of PA12 having the medicine-proof character and the heat-proof character, and an intermediate layer 121c for connecting the inner layer 121a and the outer layer 121b.

Although not illustrated, the inner layer 111a of the hose body 110 having the two-layer construction, and the inner layer 121. a of the hose body 120 having the three-layers construction can be made by the metallic layer.

Figure 7:
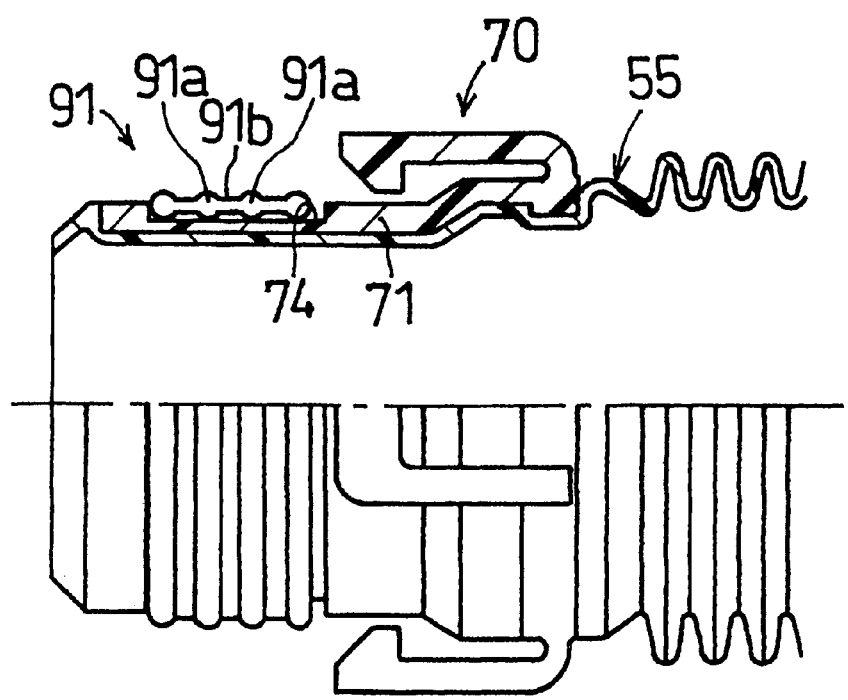
FIG. 7 is a half cross-sectional view for explaining other embodiment of the connecting member.

As shown in FIG. 7, the hose can be comprised of the hose body 55 shown in FIG. 3, and an connecting member 70 different from the above connecting member 60. That is, the connecting member 70 is provided with, on an outer peripheral surface of the linear cylindrical portion 71, a sealing groove 74 having larger axial length than that of the above sealing groove 64 of the linear cylindrical portion 61, and a tubular rubber sealing member 91 is mounted into the long sealing groove 74. The sealing member 91 includes plural ring-like sealing portions 91a each having a circular cross-section and spaced axially, and a tubular portion 91b connecting the adjacent sealing portions 91a.

Figure 8:
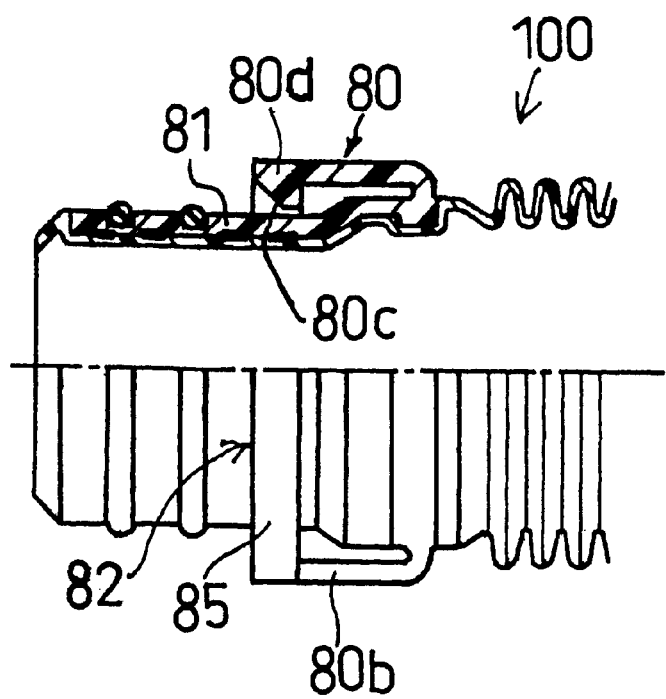
FIG. 8 a half cross-sectional view for explaining still other embodiment of the connecting member.

Also, the hose shown in FIG. 8 is comprised of a linear cylindrical portion 81 same as the linear cylindrical portion 61 shown in FIG. 3, and an connecting member 80 different from the connecting member 60. That is, the connecting member 80 has a pair of (two) arm portion 80b symmetrically opposing to each other, and free ends 80d of the both arm portions 80b are connected by arch-like connecting portions 85 to form a circular or ellipse ring portion 82, different from the connecting member 60. Two engaging pawls 80c projected radially inwardly are preferably formed on an inner peripheral surface of the ring portion 82 at positions located on extended lines of the arm portion 80b.

Figure 9:
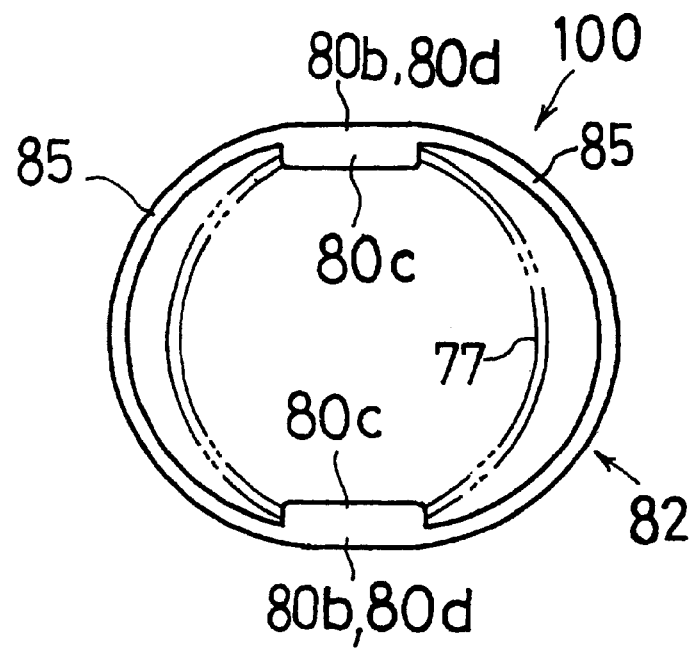
FIG. 9 is a side showing the outline for explaining the connected state of the hose shown in FIG. 8 and the mating member shown in FIG. 4.

Here, as shown in FIG. 9 which is a side view showing outline for explaining state where the hose 100 shown in FIG. 8 is connected with the mating member 75 (shown by a dotted line), an inner diameter of the ring portion 82 is selected larger than an outer diameter of the opened end portion 76 of the mating number 75 to allow deformation of the ring portion 82. On the other hand, the engaging pawls 80c formed on the inner peripheral surface of the ring portion 82 are constructed to be engaged with an annular back end surface 77a of the engaging protrusion 77 provided at the entry portion of the opened end portion 76.

Figure 10:
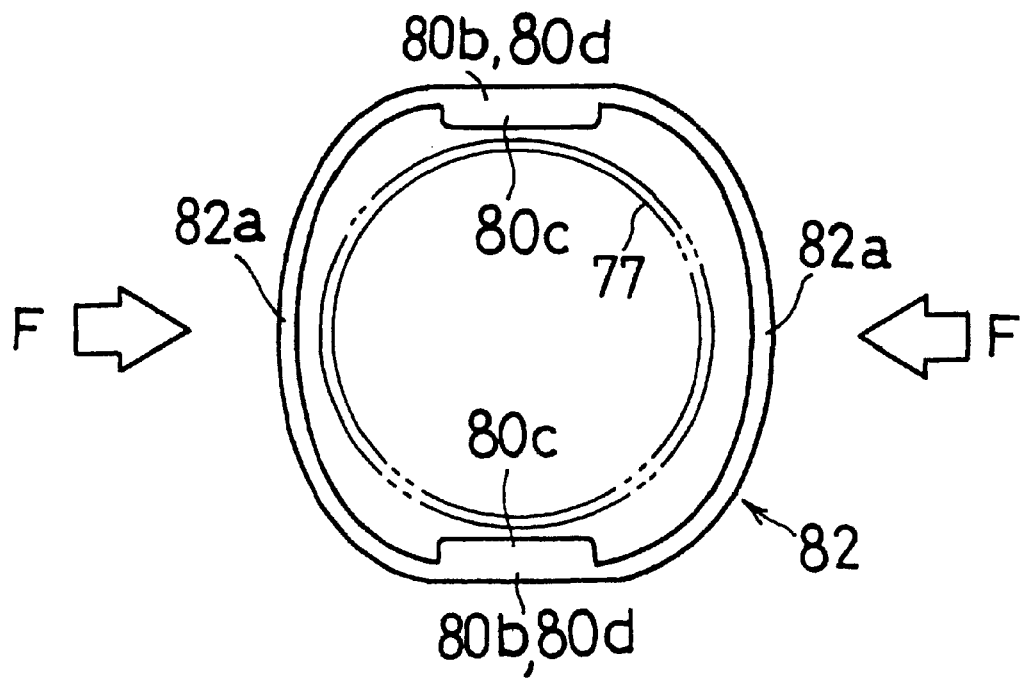
FIG. 10 is a side view showing the outline for releasing manner of the hose shown in FIG. 9 and the mating member.

Accordingly, as shown in FIG. 10, by depressing opposed parts 82a of the ring portion 82 shifted by 90 degrees from the engaging pawls 80c radially inwardly as shown by arrows F, the ring portion 82 is deformed so that the engaging pawls 80c shift radially outwardly to be disengaged from the engaging protrusion 77 of the mating member 75. In this way, the hose can be separated from the mating member 75.

Figure 11:
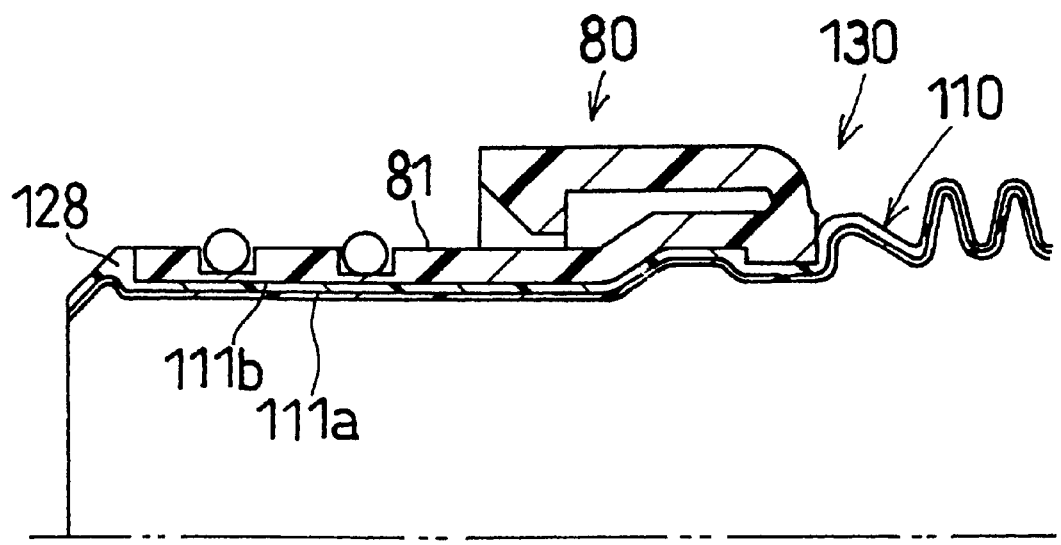
FIG. 11 is cross sectional view in which lower half is omitted for explaining the hose constructed by the hose body shown in FIG. 5 and the connecting member shown in FIG. 8.

A hose 130 shown in FIG. 11 can be comprised of the above connecting member 80 shown in FIG. 9 and the above hose body 110 shown in FIG. 5 having the two-layers construction.

Figure 12:
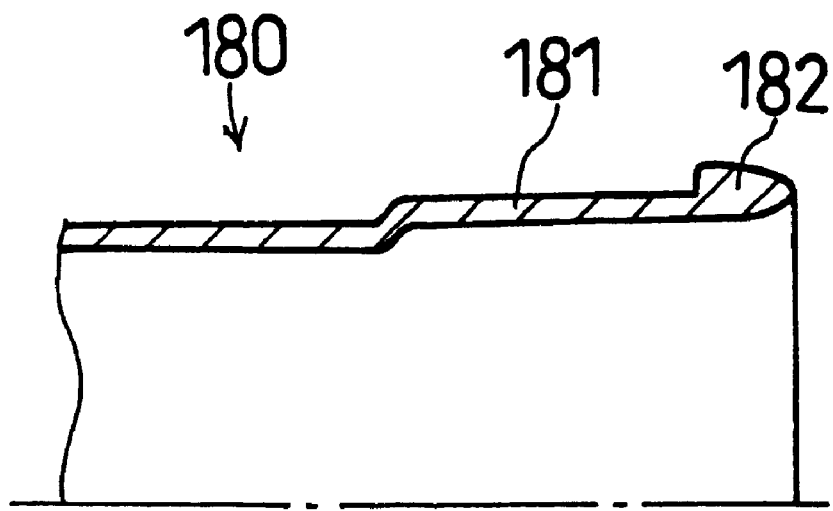
FIG. 12 is a cross-sectional view in which a lower half is omitted showing other embodiment of the mating member.
Figure 13:
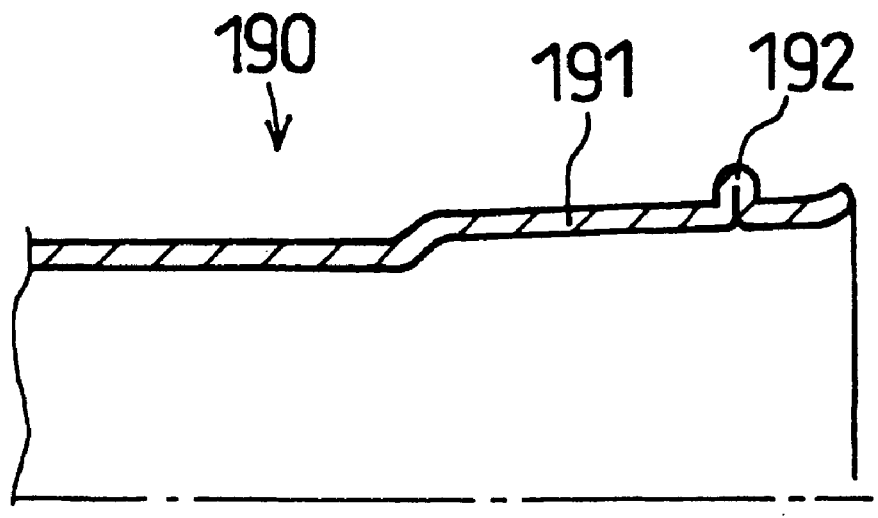
FIG. 13 is a cross-sectional view in which a lower half is omitted showing still other embodiment of the mating member.

Further, the mating member of the present invention is not limited to the above metallic pipe 75 shown in FIG. 4, but can be constructed by a resin pipe 180 as shown in FIG. 12. This resin pipe 180 is provided with an opened end portion 181 of which inner diameter is larger at one end than that at intermediate portion, and an annular engaging protrusion 182 protruded radially outwardly is formed at an entry portion, as the second engaging element. Also, as shown in FIG. 13 the mating member can be constructed by providing an opened end portion 191 having a large inner diameter at one end of a metallic pipe 190, and forming a bulge 192 protruding radially outwardly at an entry portion.

Figure 1:
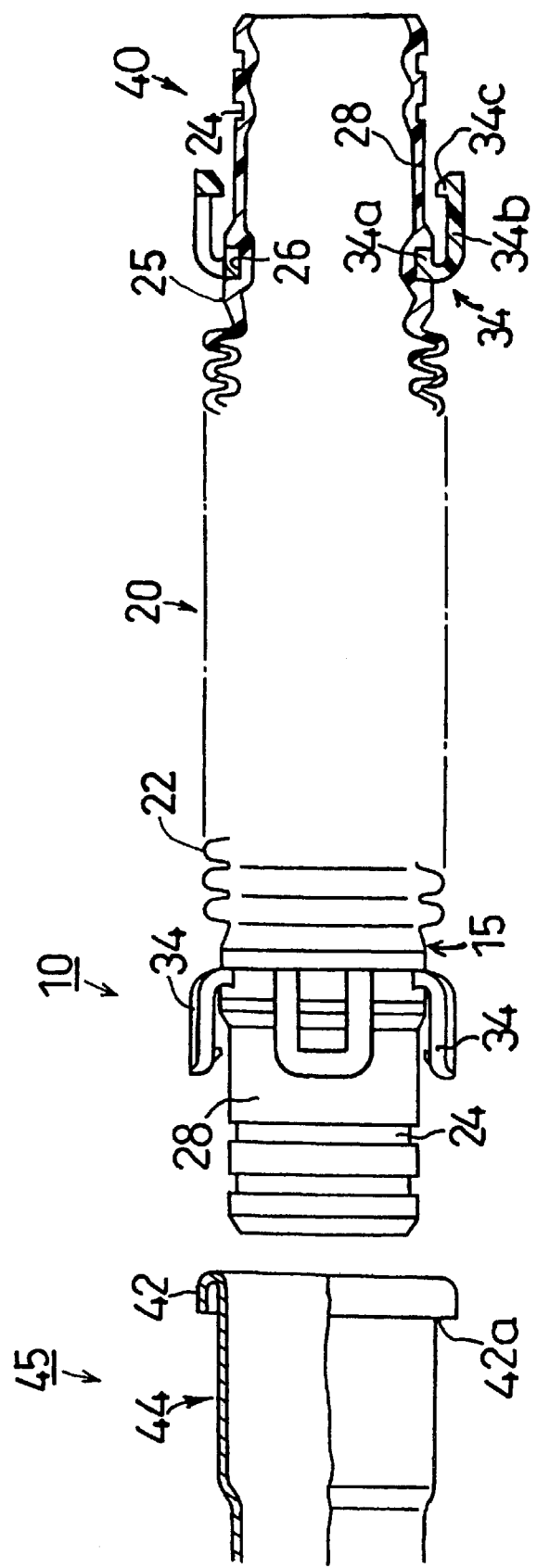
FIG. 1 is a broken cross-sectional view for explaining the conventional hose connecting structure.
Figure 2:
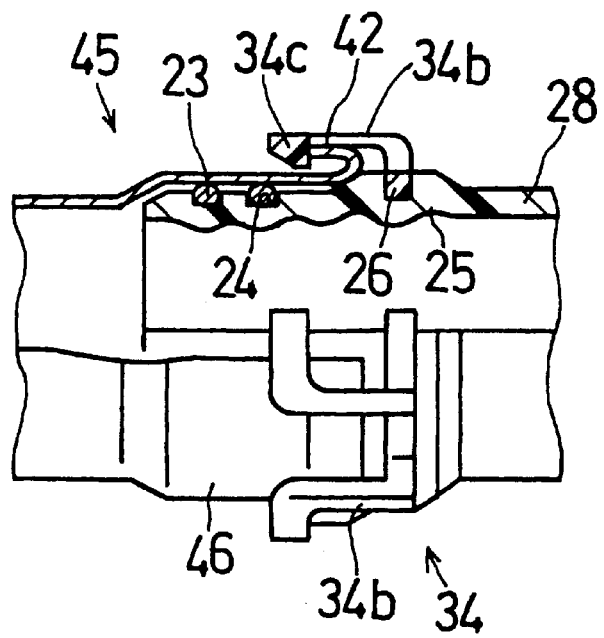
FIG. 2 is a half cross-sectional view showing the connected state of the hose connecting structure of FIG. 1.
Figure 14:
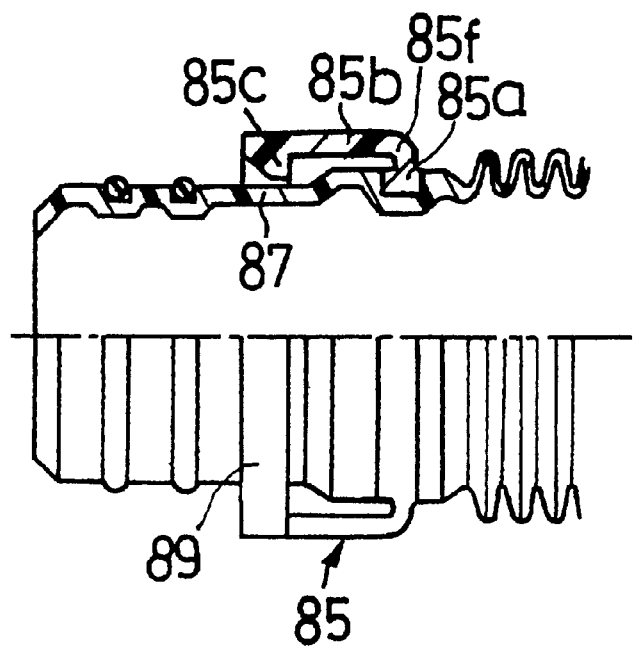
FIG. 14 is a half cross sectional view for explaining deformation of the conventional art shown in FIGS. 1 and 2.

Here, in the connecting structure shown in FIGS. 1 and 2, to prevent disengagement of the hose body from the mating member, as shown in FIG. 14, an connecting member 85 can be comprised of an annular base portion 85a, a pair of opposed arm portions 85b, a ring portion 89 and engaging protrusions 85c. The arm portions 85b extend, via a supporting portion 85f standing radially outwardly from the annular base portion 85a radially outwardly, parallel to a straight end portion 87 of the hose body. The ring portion 89 connect free ends of the arm portions 85b like a ring, and the engaging protrusions 85c are formed on an inner peripheral surface of the ring portion 89 at positions located on extended lines of the arm portions 85b.

As mentioned above, the present invention can be carried out by selectively combining the above embodiments, and can be carried out in the various modes within the gist thereof.

What is claimed is:

1. A connecting structure for connecting a tubular hose body formed by a thin cylindrical wall with a mating member in a fluidtight condition, comprising:

said tubular hose body including the thin cylindrical wall having an outer surface and an inner surface extending substantially parallel to the outer surface in the tube, and extending from one end to other end;

a straight end portion formed integral with said hose body at least at the one end extending straightly, and an annular groove formed on a mold-formed outer surface thereof and extending radially inwardly integral with the mold-formed outer surface at position axially spaced from a tip end, to be connected with said mating member;

an connecting member including a cylindrical portion secured to the outer surface of said straight end portion coaxially therewith, an annular protrusion extending radially inwardly from an inner peripheral surface of other end of the cylindrical portion and fitted into the annular groove, a sealing groove formed on an outer peripheral surface of the one end of the cylindrical portion, a plural first engaging elements each extending radially outwardly from the outer peripheral surface of the other end of the cylindrical portion to provide a radial space between the first engaging element and the outer peripheral surface of the cylindrical portion by slot, each of said first engaging elements having a deforming portion and engaging pawl formed at a free end of the deforming portion directed radially inwardly and integrally arranged on the cylindrical portion spaced circumferentially from each other;

a mating member including a tubular opened end portion having an engaging inner peripheral surface adapted to receive the cylindrical portion secured on the outer surface of said straight end portion of said hose body;

a second engaging element formed at an entry portion of the opened end portion of said mating member protruded radially outwardly, said second engaging element engaging with said first element when said straight end portion of said hose body is inserted into the engaging inner peripheral surface of the opened end portion together with the cylindrical portion secured to said straight end portion; and a sealing member mounted into the sealing groove for sealing between the engaging inner peripheral surface of the opened end portion of said mating member and an engaging outer peripheral surface of the cylindrical portion inserted into the engaging inner peripheral surface of the opened end portion together with said straight end portion.

2. A connecting structure according to claim 1, wherein said hose body has a bellow portion between said straight end portion and the other end.

3. A connection structure according to claim 2, wherein said straight end portion has an annular swelled portion swelled radially outwardly at a tip end, and a large-diameter portion having a tapered portion at a rear portion.

4. A connecting structure according to claim 1, wherein said hose body is constructed by one layer formed by a blow-forming of a thermoplastic resin material.

5. A connection structure according to claim 4, wherein said straight end portion of said hose body made of the metallic material is mold-formed by a metal liquid bulge forming.

6. A hose connecting structure according to claim 5, wherein the inner layer has thickness smaller than thickness of the outer layer.

7. A connecting structure according to claim 4, wherein said hose body is constructed by plural layers.

8. A connecting structure according to claim 7, wherein said hose body is constructed by an inner layer and an outer layer.

9. A connection structure according to claim 7, wherein said hose body is constructed by an inner layer, an outer layer, and an intermediate layer connecting the inner layer and the outer layer.

10. A connection structure according to claim 9, wherein the inner layer or the outer layer made of the resin material is formed by blow-forming of the thermoplastic resin material, and the inner layer made of the metallic material is formed by a metal liquid bulge of a thin metallic tube.

11. A connecting structure according to claim 1, wherein said hose body is constructed by one layer formed by a formed by a metallic material.

12. A connecting structure according to claim 1, wherein said hose body is constructed by an inner layer made of a metallic material excellent in a gasoline-proof character and gasoline permeability-proof, character, and an outer layer made of a resin material excellent in a heat-proof character or weather-proof character and medicine-proof character.

13. A connection structure according to claim 1, wherein the cylindrical portion of said connecting member has thickness larger than thickness of said straight end portion of said hose body.

14. A connection structure according to claim 1, wherein the deforming portion of said connecting member includes a supporting portion extending radially outwardly from the annular projection, and plural arm portions extending from the supporting portion substantially axially parallel to the cylindrical portion.

15. A hose connection structure according to claim 14, wherein the plural arm portions are connected at free ends by a connecting portion extending in a circumferential direction in a ring shape.

* * * * *